US009705758B2

(12) United States Patent
Anderson et al.

(10) Patent No.: US 9,705,758 B2
(45) Date of Patent: *Jul. 11, 2017

(54) MANAGEMENT OF CLOUD PROVIDER SELECTION

(71) Applicant: International Business Machines Corporation, Armonk, NY (US)

(72) Inventors: Jason L. Anderson, San Jose, CA (US); Vincent A. Belfoure, Lakewood, CO (US); Gregory J. Boss, Saginaw, MI (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 696 days.

This patent is subject to a terminal disclaimer.

(21) Appl. No.: 14/083,669

(22) Filed: Nov. 19, 2013

(65) Prior Publication Data

US 2015/0142950 A1 May 21, 2015

(51) Int. Cl.
*G06F 15/173* (2006.01)
*H04L 12/24* (2006.01)
(Continued)

(52) U.S. Cl.
CPC ........ *H04L 41/5019* (2013.01); *G06F 9/5044* (2013.01); *H04L 41/50* (2013.01);
(Continued)

(58) Field of Classification Search
CPC .............. H04L 41/5019; G06F 9/5044
(Continued)

(56) References Cited

U.S. PATENT DOCUMENTS

| 8,396,807 B1 | 3/2013 | Yemini et al. |
| 2008/0320482 A1 | 12/2008 | Dawson et al. |

(Continued)

FOREIGN PATENT DOCUMENTS

WO 2010088437 A2 8/2010

OTHER PUBLICATIONS

Anderson et al., "Management of Cloud Provider Selection", U.S. Appl. No. 14/476,131, filed Sep. 3, 2014.
(Continued)

*Primary Examiner* — Dustin Nguyen
*Assistant Examiner* — Joel Mesa
(74) *Attorney, Agent, or Firm* — Robert J. Shatto

(57) ABSTRACT

A computer-implemented method, a computer program product, and a system for selecting a host from a plurality of host for an application pattern component using a service level agreement (SLA) requirement are provided. The computer-implemented method for selecting a host from a plurality of hosts for an application pattern component using a service level agreement requirement can include receiving the service level agreement requirement for the application pattern component. The method can include receiving a first capability metric of the host from the plurality of hosts. The method can include determining whether the first capability metric of the host from the plurality of hosts is sufficient for the service level agreement requirement. The method can include selecting the host in response to the host being sufficient for the service level agreement requirement.

12 Claims, 6 Drawing Sheets

(51) Int. Cl.
*H04L 12/911* (2013.01)
*G06F 9/50* (2006.01)
*H04L 12/26* (2006.01)

(52) U.S. Cl.
CPC .......... *H04L 41/5006* (2013.01); *H04L 47/70* (2013.01); *H04L 43/08* (2013.01)

(58) Field of Classification Search
USPC .................................................. 709/224, 223
See application file for complete search history.

(56) References Cited

U.S. PATENT DOCUMENTS

| | | | |
|---|---|---|---|
| 2010/0319004 A1 | 12/2010 | Hudson et al. | |
| 2010/0332549 A1 | 12/2010 | Nichols et al. | |
| 2011/0099228 A1* | 4/2011 | Smith .............. | H04N 21/23103 709/205 |
| 2012/0116747 A1* | 5/2012 | Hadar .................... | G06Q 10/00 703/22 |
| 2012/0116937 A1 | 5/2012 | Van Biljon et al. | |
| 2012/0134491 A1 | 5/2012 | Liu | |
| 2012/0239825 A1 | 9/2012 | Xia et al. | |
| 2012/0304179 A1 | 11/2012 | Devarakonda et al. | |
| 2012/0311012 A1 | 12/2012 | Mazhar et al. | |
| 2012/0324069 A1 | 12/2012 | Nori et al. | |
| 2012/0324114 A1 | 12/2012 | Dutta et al. | |
| 2012/0324116 A1 | 12/2012 | Dorai et al. | |
| 2013/0060839 A1 | 3/2013 | Van Biljon et al. | |
| 2013/0080626 A1 | 3/2013 | Thireault | |

OTHER PUBLICATIONS

Cisco, "Planning the Migration of Enterprise Applications to the Cloud", White Paper, pp. 1-9, © 2010 Cisco Systems, Inc.
EMC Solutions Group, "Optimizing Cloud Deployment of Virtualized Applications on EMC Symmetrix VMAX Cloud Edition", EMC White Paper, Feb. 2013, pp. 1-24, Copyright © 2013 EMC Corporation.
Janardhan et al., "Data invulnerability and data integrity verification of multi cloud storage", International Journal of Computer Trends and Technology (IJCTT), Apr. 2013, vol. 4, Issue 4, pp. 707-709.
Mell et al., "The NIST Definition of Cloud Computing", National Institute of Standards and Technology, NIST Special Publication 800-145, Sep. 2011, Gaitersburg, MD.
Oracle, "Oracle Optimized Solution for Enterprise Cloud Infrastructure", Oracle Technical White Paper, Jun. 2011, Oracle Corporation, Redwood Shores, CA, Copyright © 2011 Oracle.
Zeginis et al., "A User-Centric Multi-Paas Application Management Solution for Hybrid Multi-Cloud Scenarios", Scalable Computing: Practice and Experience, vol. 14, No. 1, pp. 17-32, © 2013 SCPE. DOI: 10.12694/scpe.v14i1.824.

* cited by examiner

MANAGEMENT OF CLOUD PROVIDER SELECTION

BACKGROUND

This disclosure generally relates to the field of information processing systems, and more particularly relates to managing a selection of cloud providers.

The increasing number of public Cloud Providers affords consumers a greater range of flexibility when determining where workloads and applications can be hosted. Scenarios where n-tiered applications can be hosted across multiple providers can become a potential solution.

SUMMARY

Embodiments of the disclosure provide for a computer-implemented method, a computer program product on a computer storage medium, and a system for selecting a host from a plurality of hosts for an application pattern component using a service level agreement (SLA) requirement.

The computer-implemented method for selecting a host from a plurality of hosts for an application pattern component using a service level agreement requirement can include receiving the service level agreement requirement for the application pattern component. The method can include receiving a first capability metric of the host from the plurality of hosts. The method can include determining whether the first capability metric of the host from the plurality of hosts is sufficient for the service level agreement requirement. The method can include selecting the host in response to the host being sufficient for the service level agreement requirement.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Aspects of the present disclosure can be directed toward a Service Level Agreement (SLA) registry service. The SLA registry service can recommend a cloud provider to fulfill a particular Service Level Agreement (SLA) requirement from a pattern, e.g., an application framework. The SLA registry service can receive a capability metrics of a cloud provider. The SLA registry service can also compare the capability metrics with the SLA requirements and select the cloud provider based on the comparison. Although not necessarily limited thereto, embodiments of the present disclosure can be appreciated in the context of recommending cloud providers.

In the descriptions provided herein, specific details of various embodiments are provided. However, various embodiments may be practiced with less than all of these specific details. In other instances, certain methods, procedures, components, structures, and/or functions are described in no more detail than to enable the various embodiments of the disclosure, for the sake of brevity and clarity.

Due to the lack of control of the infrastructure, consumers can require that cloud providers meet or exceed published Service Level Agreements (SLAs), e.g., response time, availability and a probability of services becoming unavailable. There can be an impact to the cloud consumer business when a service becomes unavailable, mechanisms can exist for compensation which may include credits, fees or penalties imposed upon the provider breaching an SLA. With the ability to distribute n-tiered applications across multiple cloud providers, the matrix of providers, SLAs, costs and compensation models can become increasingly complex.

Figure 1:
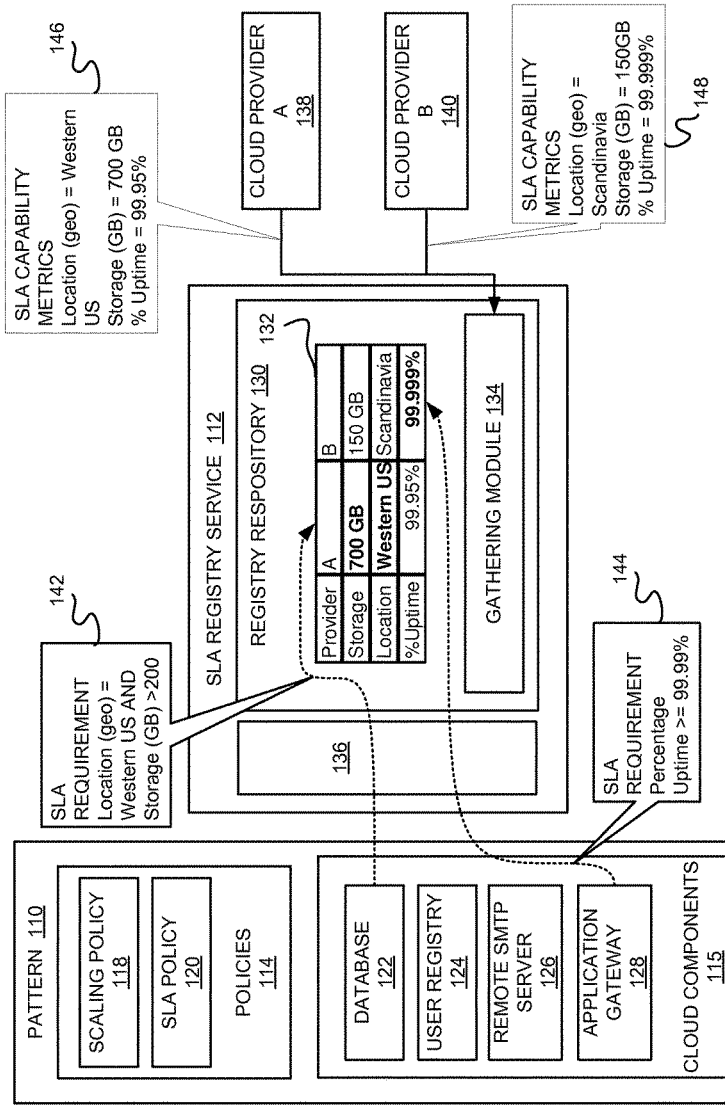
FIG. 1 illustrates a system that receives inputs from an application pattern and a plurality of cloud providers, according to various embodiments.

FIG. 1 illustrates a SLA Registry Service 112 that receives inputs from an application pattern 110 and a plurality of cloud providers, according to various embodiments. For purposes of illustration, only two cloud providers, Cloud provider A 138 and Cloud provider B 140, are shown.

The application pattern 110 can be the result of a compilation on an application server. The application pattern 110 can also refer to a virtual application pattern. Virtual application patterns 110 are constructed with application-centric design. The virtual application pattern 110 can provide a mechanism to represent middleware applications in a simplified model that can abstract away the underlying middleware infrastructure to a user. The application patterns 110 can be implemented using virtual application pattern types that integrate the capabilities of multiple middleware software elements into a single deployable unit.

Virtual application patterns 110 can raise the level of abstraction one notch higher than virtual system (topology) patterns and put the focus on the application. Virtual application patterns 110 can encapsulate the installation, configuration, and integration of middleware, as well as the installation and configuration of applications that run on that middleware.

The application pattern 110 can have two types of components: cloud components 115 and policies 114. Generally, a cloud component 115 can represent a middleware service that is needed by the virtual application instance. A policy 114 can represent how a middleware service is configured during deployment, including how the qualities of service are defined.

Examples of policies 114 can include a scaling policy 118 and an SLA policy 120. The SLA policy 120 can allow an administrator to set standards of performance for the application. In various embodiments, the administrator can determine the SLA requirements of the application pattern 110.

The scaling policy 118 can indicate the ability of the application to increase or decrease the computing capacity. For example, if a web application is to be highly available, then a scaling policy 118 can be added. When the scaling policy 118 is added, a Virtual Application Builder can create the web application.

Cloud components 115 can include a database 122, a user registry 124, a remote Simple Mail Transfer Protocol (SMTP) server 126, and an application gateway 128.

Although only 4 examples of cloud components 115 are shown, other configurations are contemplated.

The database 122 can allow the web application to manage the data. The database 122 can have an SLA requirement 142 of a certain geography where the data can be hosted. A geography restriction can be used for compliance with local laws regarding data storage. The database 122 can also have an SLA requirement 142 that specifies the minimum storage requirements. The storage requirements can be in terms of records or total size. The database 122 can have an SLA requirement 142 that specifies that the location of a Cloud Provider must be in the Western United States and the Cloud Provider must support a database 122 capacity of greater than 200 GB.

A user registry 124 can hold user account information, such as a user ID and password that can be accessed during authentication. Examples of a user registry 124 can include WebSphere™ Application Server and WebSphere® Portal.

The application gateway 128 can use a Hypertext Transfer Protocol (HTTP). An HTTP server can allow users to interact remotely with the web application through a network. The application gateway 128 can have an SLA requirement 144 for a cloud provider that specifies that the cloud provider has at least 99.99% uptime.

The SLA registry service 112 can compare the SLA requirements, e.g., 142, 144, from the application pattern 110 to a capability metric for the SLA from plurality of cloud providers. The capability metric can be a metric that describes the ability of the cloud provider to fulfill an SLA requirement. For example, if the SLA requirement is a response time, then the capability metric for a cloud provider can be the average response time of the cloud provider in fulfilling the user request.

The SLA registry service 112 can select cloud providers based on the comparison. The SLA registry service 112 can receive capability metrics from cloud providers, e.g., 138, 140, independent from the SLA requirements from the application pattern 110. The SLA registry service 112 can be hosted as a standalone service or as an add-on to a hosting service. The SLA registry service 112 can include a registry repository 130.

The registry repository 130 can be a listing of the cloud providers and a cloud provider's respective capability metric. According to various embodiments, the registry repository 130 can have a table, e.g., table 132. The table 132 can describe the available capability metric from the cloud providers. The registry repository 130 can have a gathering module 134 that receives the capability metrics from the cloud providers. For example, Cloud provider A 138 can send the SLA capability metrics 146 to the gathering module 134 that up to 700 GB of data will be stored in the Western United States with 99.95% uptime. Cloud provider B 140 can send the capability metrics 148 to the gathering module 134 that up to 150 GB of data will be stored in Scandinavia with at least 99.999% uptime. The gathering module 134 can populate the table 132 with the capability metric.

The SLA registry service 112 can also have a comparison engine 136. The comparison engine 136 can receive the SLA requirement from components of the cloud components 115. Once the SLA requirement is received, then the comparison engine 136 can compare the requirement with each cloud provider to determine whether a cloud provider meets at least one of the requirements for the cloud component 115. For example, the database 122 needs an SLA requirement 142 of the Western United States and more than 200 GB of storage. Cloud provider A 138 can meet the storage and geography SLA requirements 142. The database 122 may not have a SLA requirement 142 for uptime and can be hosted by Cloud Provider A 138. The comparison engine 136 can receive the SLA requirement 144 for the application gateway 128 which can require that the uptime be at least 99.99%. The comparison engine 136 can monitor the table 132 to determine that Cloud Provider B 140 meets the % uptime SLA requirement 144 for the application gateway 128.

The SLA registry service 112 can recommend that Cloud Provider A 138 host the database 122 and Cloud Provider B 140 host the application gateway 128. Different cloud components 115 of can be hosted by different cloud providers. According to various embodiments, the cloud component 115, e.g., a database 122, can be hosted by more than one cloud provider. For example, the application gateway 128 can be hosted by both cloud provider A 138 and cloud provider B 140 to increase the percentage of uptime in a method described further herein.

In various embodiments, the comparison engine 136 can provide weights to different SLA requirements. For example, if preference is given to a single cloud provider, and the SLA registry service 112 assigns a higher weight to the storage SLA requirement than the uptime SLA requirement, then the SLA registry service 112 can recommend cloud provider A 138 to host the application pattern 110.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
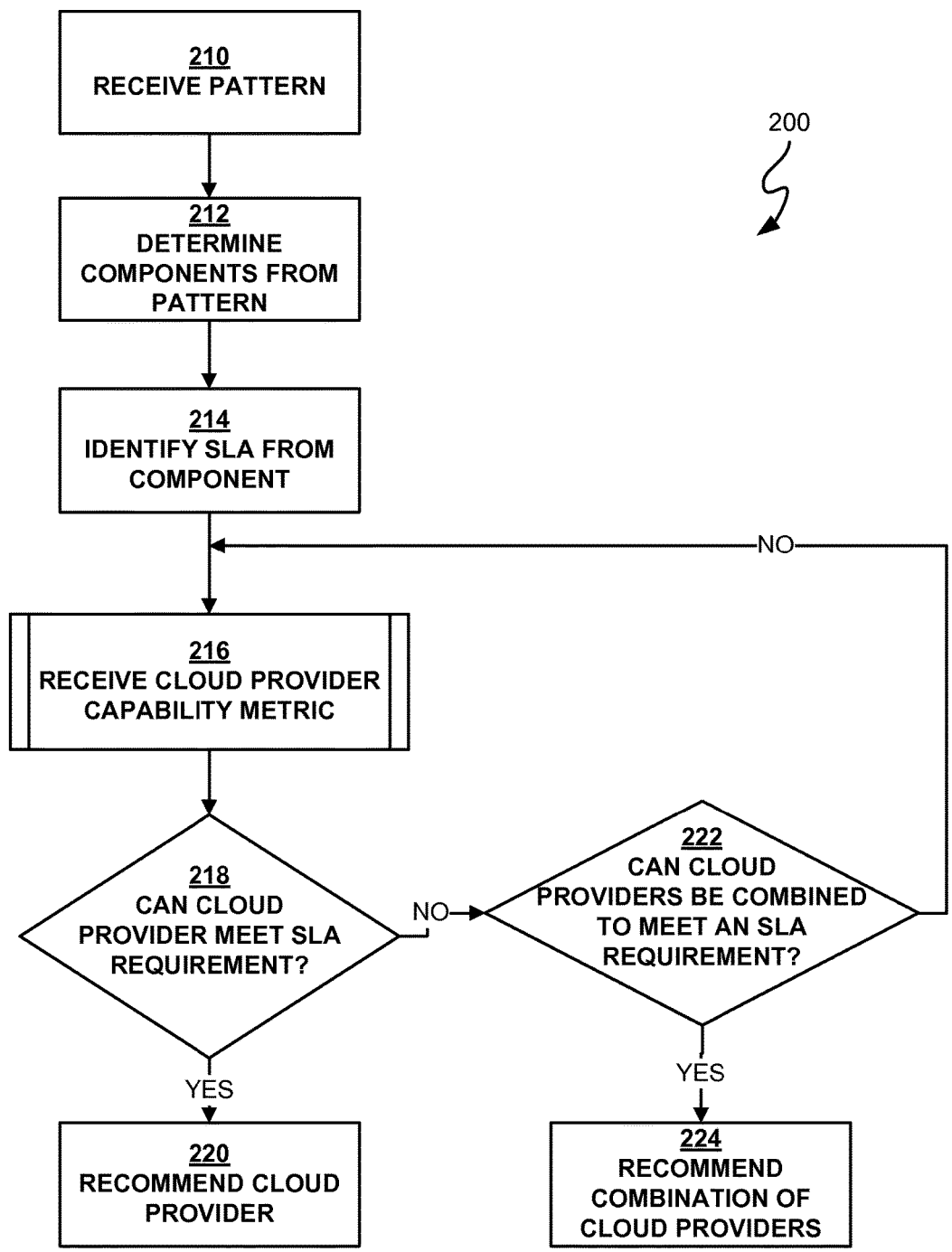
FIG. 2 illustrates a method of recommending a cloud provider based on the SLA requirements, according to various embodiments.

FIG. 2 illustrates a method 200 of recommending a cloud provider based on the SLA requirements, according to various embodiments. The method 200 can be a similar method to that used on the SLA registry service 112 on FIG. 1. The method 200 can begin at operation 210.

In operation 210, the SLA registry service can receive the pattern. The pattern can be the same as the application pattern 110 in FIG. 1. The pattern can be compiled from a variety of binaries. After the pattern is received, then the method 200 can continue to operation 212.

In operation 212, the SLA registry service can determine the components from the pattern. The components can include the web application container. In various embodiments, the components can be based off of the pattern. A pattern engine can split the web application container into components. After the components from the pattern are determined, then the method 200 can continue to operation 214.

In operation 214, the SLA registry service can identify the SLA requirements for each application pattern component. The SLA requirement can be included in the metadata of the pattern file for each component. The SLA requirement can also be specified in the pattern for the component, e.g., database can specify a geographic area. In various embodiments, the SLA requirement can be inferred from the application-level SLA. For example, if the application-level SLA contains the SLA requirement for storage and database access time, then the SLA registry service can infer that the storage and database access time SLA requirement applies to a database component of the application. After the SLA requirement is identified from the component, then the method 200 can continue to operation 216.

In operation 216, the SLA registry service can receive a cloud provider capability metric. The SLA registry service can request the cloud capability metric from the cloud provider in order to create a listing. In various embodiments, the capability metrics from the cloud provider can be pushed by the cloud provider to the SLA registry service. The process of receiving a capability metric can be further described herein. After the capability metric for the cloud provider is received, the method 200 can continue to operation 218.

In operation 218, the SLA registry service can determine whether the cloud provider can host the SLA requirement for an application component. The SLA registry service can compare the SLA requirement from the application component to the capability metric from the cloud providers. If the SLA requirement is sufficiently served by the capability metric for the cloud provider, then the SLA registry service can determine that the cloud provider is sufficient for the SLA requirement and the method 200 can continue to operation 220. If the cloud provider cannot meet the SLA requirement, i.e., insufficient for the SLA requirement, then the method 200 can continue to operation 222.

In operation 220, the SLA registry service can recommend the cloud provider for the component. The recommendation can occur by prompting a user or an application. In various embodiments, the application can automatically have the cloud provider host the component.

In operation 222, the SLA registry service can determine whether the cloud providers can be combined to meet an SLA requirement. For example, if a pattern requires 99.999% uptime, and a first cloud provider, cloud A, has a capability metric for uptime of 99.99% and a second cloud provider, cloud B, has a capability metric for uptime of 99.5%, and a third cloud provider, cloud C has an uptime of 99.9%, then the first cloud provider and the second cloud provider can both host the pattern. For instance, the probability of cloud A going down is $(100-99.99)/100=0.0001$ and the probability of cloud B going down is $(100-99.50)/100=0.005$. The probability for cloud C going down is $(100-99.9)/100=0.001$. The probability of cloud A, and cloud B, and cloud C down at the same time=$0.0001*0.005*0.001=0.0000000005$, therefore the percentage of unavailability for cloud A and cloud B and cloud C is $=0.0000000005*100=0.00000005\%$ and the percentage of combined SLA requirement for Cloud A and Cloud B and Cloud C is =100−0.00000005%=99.99999995%. A generic formula to determine whether percentages can be combined from a combination of N cloud providers is:

$$100 - \left( \frac{100 - SLA_{cloudA} * 100 - SLA_{cloudB} * \ldots * 100 - SLA_{cloudN}}{100^{N-1}} \right)$$

Operation 222 can also involve a determination of which combination of cloud providers meet a set of user constraints. For example, a list of SLA requirements, e.g., price, availability, remediation, can be defined as properties A, B, and C. A set of constraints can be defined as A [<|>] userValueA, B [<|>] userValueB, C [<|>] userValueC. The core set of linear inequalities, e.g., $a_1*x+a_2*y+a_3*z$ [>|<] userValueA; $b_1*x+b_2*y+b_3*z$ [>|<] userValueB; $c_1*x+c_2*y+c_3*z$ [>|<] userValueC can be solved with a, b, and c being a SLA requirement and x, y, and z being respective weights of that correspond to different SLA requirements.

If the SLA registry service determines the cloud providers can be combined to meet an SLA requirement, then the method 200 can continue to operation 224. If the SLA registry service determines that the cloud providers can not be combined to meet the SLA requirement, then the method 200 can continue to operation 216 where the SLA registry service continues to receive the updated capability metrics from cloud providers. In various embodiments, the capability metric can be requested from cloud providers in order to fulfill the SLA requirement. According to various embodiments, the SLA registry service can also prompt a user that the SLA requirement cannot be fulfilled and request that the SLA requirement be relaxed. The SLA registry service can also give a reason of why the cloud provider cannot host the SLA requirement.

In operation 224, the SLA registry service can recommend the combination of cloud providers for the SLA requirement. In various embodiments, the SLA registry service can recommend the first combination of cloud providers that can fulfill the SLA requirement. The SLA registry service can also recommend the combination of cloud providers that are optimal. For example, if a first cloud provider and a second cloud provider can fulfill the SLA requirement, but a third cloud provider can be added to the first and second cloud provider, then the SLA registry service can recommend hosting the pattern on the first, second, and third cloud provider. Similarly, if a first cloud provider and a second cloud provider can fulfill the SLA requirement, and, after the first and second cloud providers are selected, the SLA registry service receives a capability metric of a third cloud provider that can also host the SLA requirement, then the SLA registry service can recommend the third cloud provider.

Figure 3:
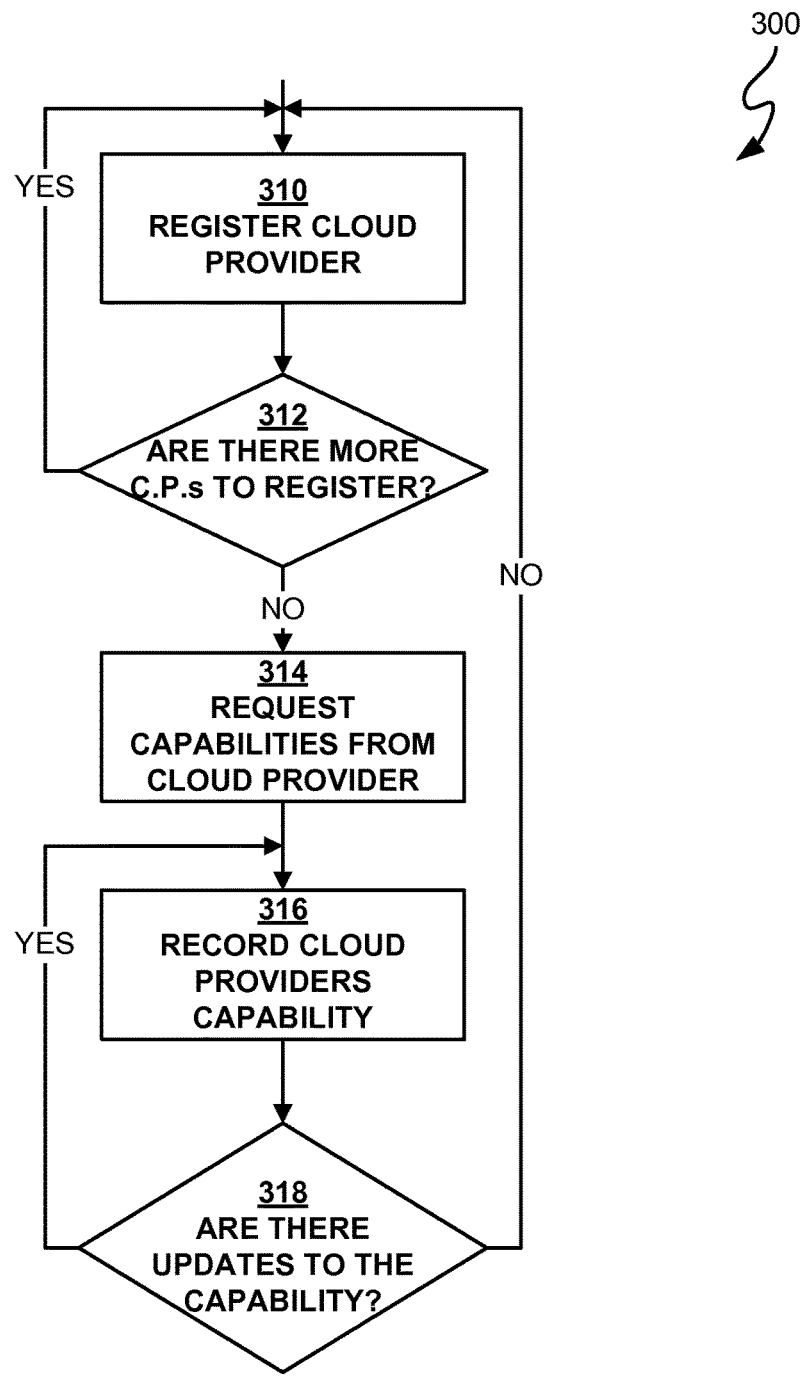
FIG. 3 illustrates a method of receiving a capability metric of a cloud provider, according to various embodiments.

FIG. 3 illustrates a method 300 of receiving a capability metric of a cloud provider, according to various embodiments. Generally, the SLA registry service can register cloud providers and request the capability metrics from the cloud providers. The method 300 can correspond to operation 216 in FIG. 2. The method 300 can begin at operation 310.

In operation 310, the SLA registry service can register a cloud provider. The registration can include establishing communication with the cloud provider. After communication is established, the SLA registry service can determine whether there are more cloud providers to register in operation 312. In various embodiments, the cloud providers can be added to a list within the SLA registry service. The list can include addresses where the cloud providers are located. The SLA registry service can establish communication with the cloud providers to confirm the correct address. Once there are no more cloud providers to register, then the method 300 can continue to operation 314.

In operation 314, the SLA registry service can request the capability metrics from the cloud providers. The request can occur as a group or individually. In various embodiments, the request can be based off of historical usage. For example, if a previously used cloud provider was used to host an SLA requirement in a previous iteration, then the previously used cloud provider can be prioritized by the SLA registry service when requesting the capability metrics. After the capability metrics are requested from the cloud provider, then the method 300 can continue to operation 316.

In operation 316, the SLA registry service can record the capability of the cloud providers. The capability metrics can be recorded in a dedicated file such as a page file. After the capability metrics of the cloud providers is recorded, the method 300 can continue to operation 318.

In operation 318, the SLA registry service can monitor the cloud providers for updates to the capability metrics. In various embodiments, the cloud providers can be configured to update the capability metrics whenever the capability metrics change. For example, if the capability for hosting an uptime changes from 99.995% to 99.99993%, then the cloud provider can immediately send an updated capability to the SLA registry service. If there are updates, then the method 300 can continue to operation 316. If there are not any updates, then the method 300 can continue to operation 310.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
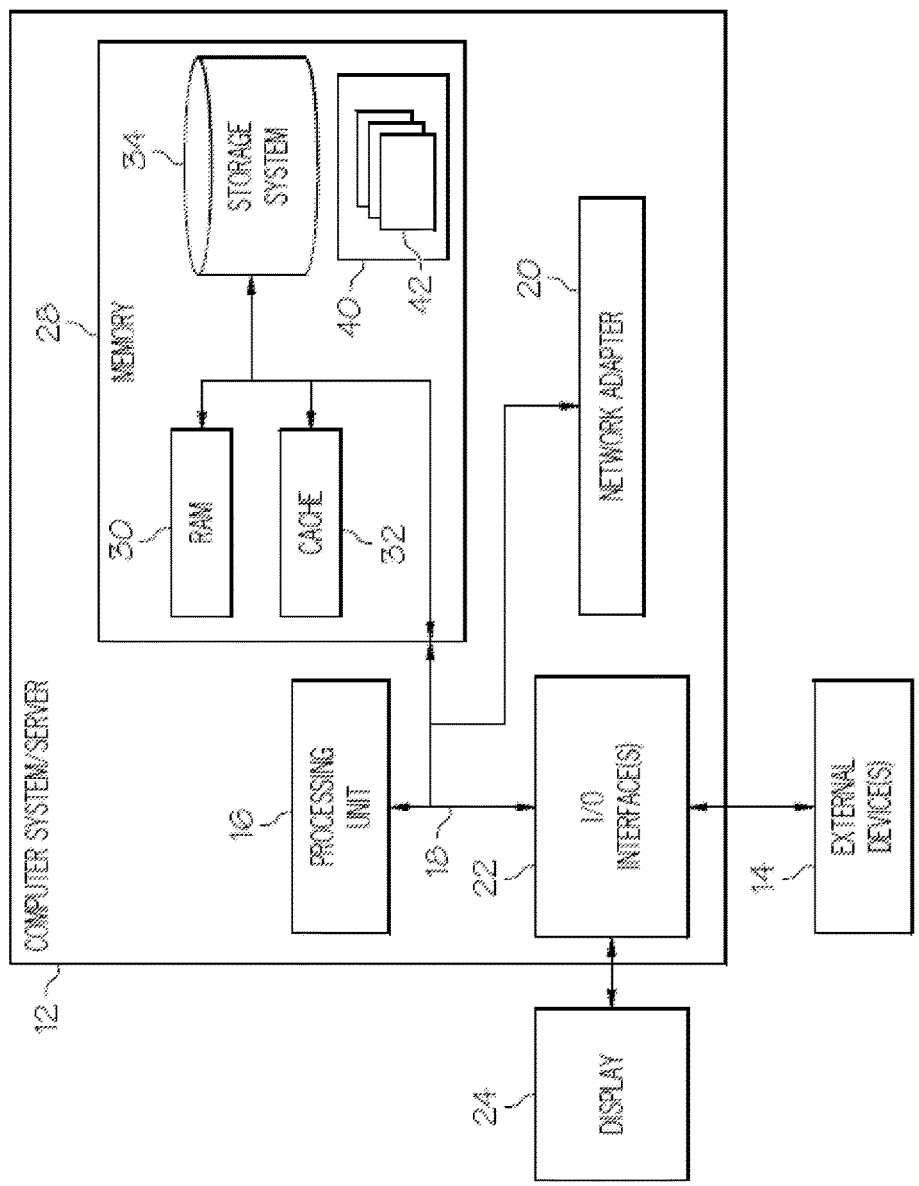
FIG. 4 illustrates a cloud computing node, according to various embodiments.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

For example, the gathering module and comparison engine of the SLA registry service can be a program module 42. The SLA registry service can be a program 40. The gathering module and comparison engine can be hosted on the RAM 30 and the instructions of the gathering module and the comparison engine can be executed by the processor 16. The registry repository can be stored on the system storage 34 and retrieved by the RAM 30 or cache 32 when accessed.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
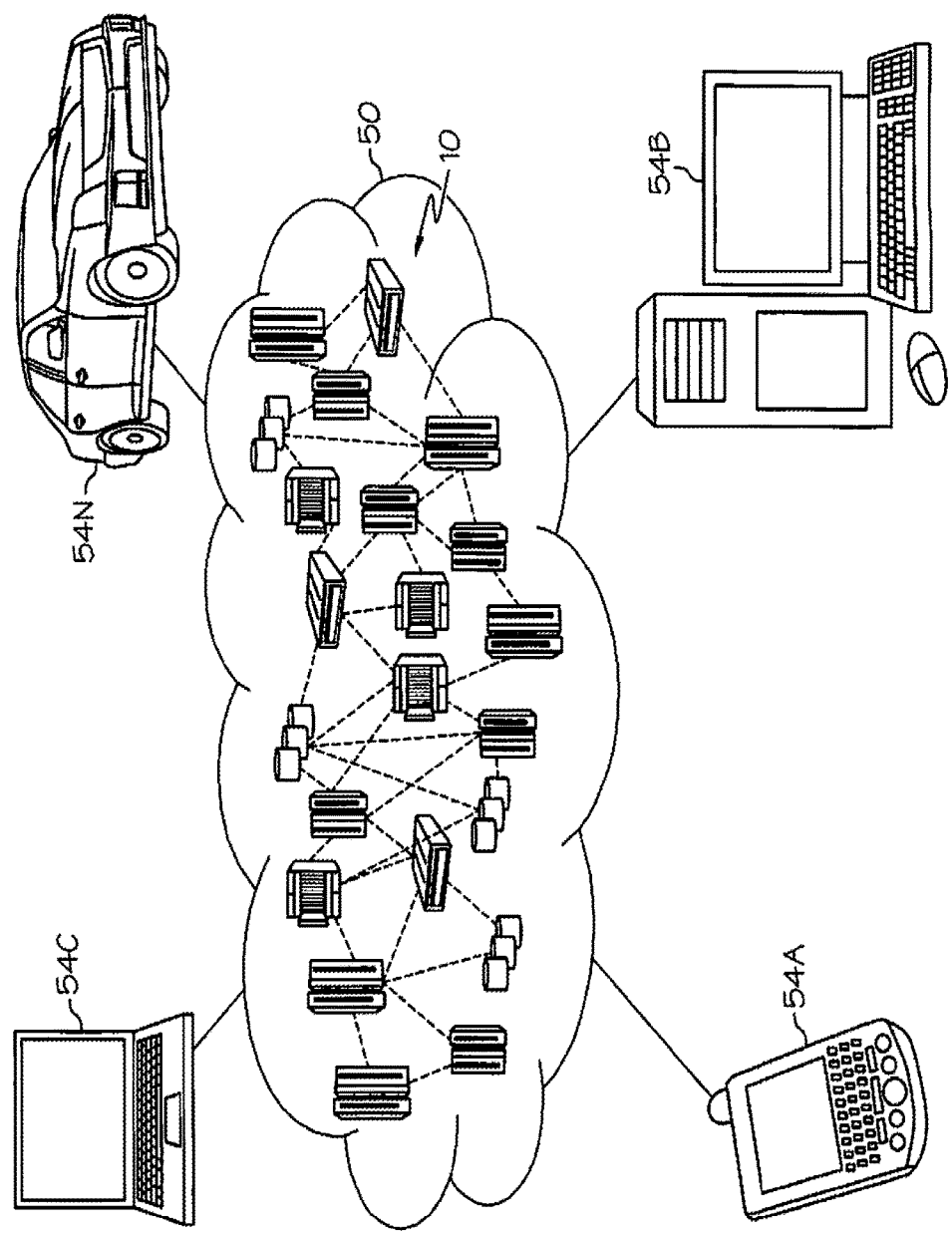
FIG. 5 illustrates a cloud computing environment, according to various embodiments.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 6:
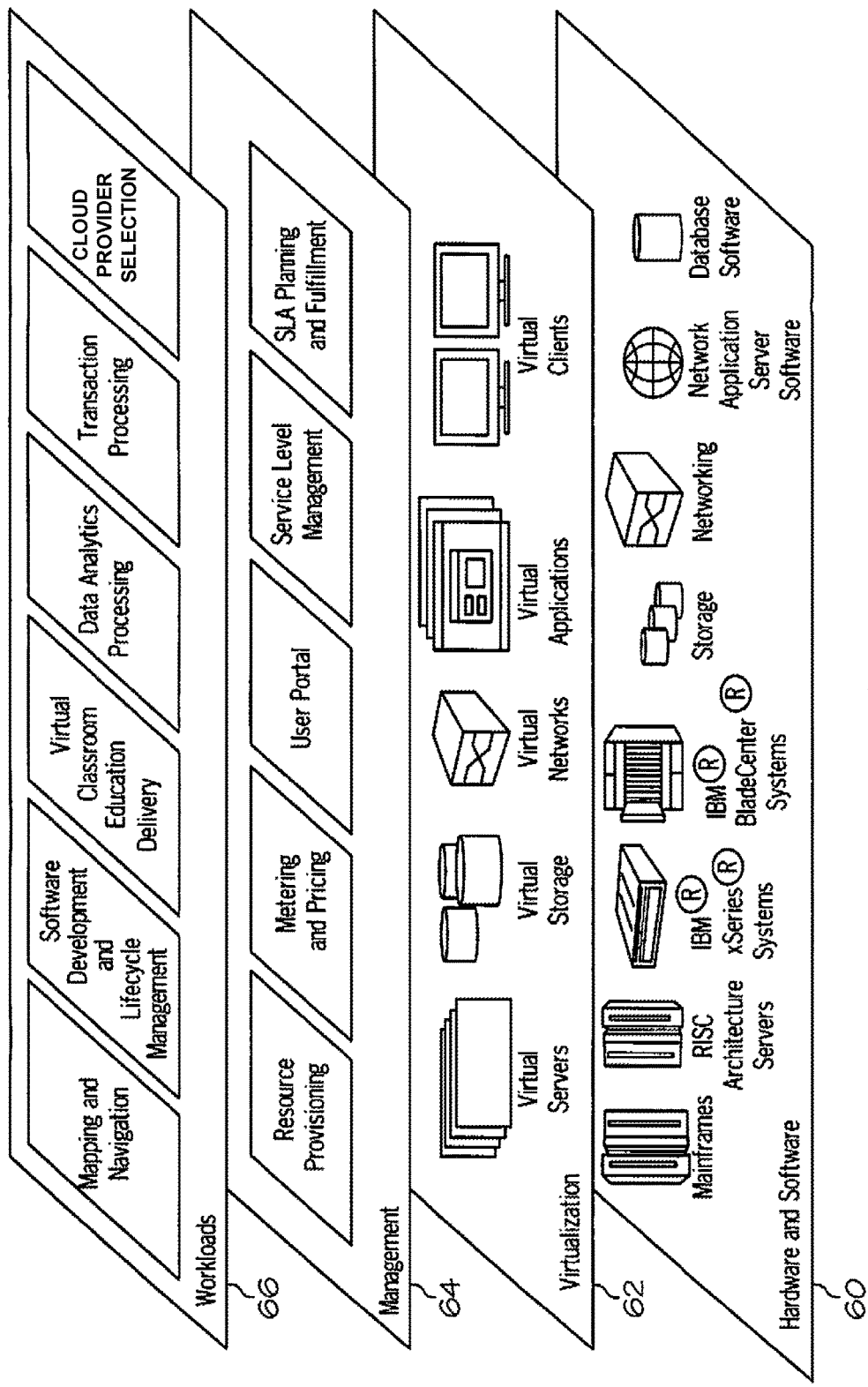
FIG. 6 illustrates abstraction model layers, according to various embodiments.

Referring now to FIG. 6, a set of functional abstraction layers provided by cloud computing environment 50 (FIG. 5) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud provider selection based on meeting select SLA requirements.

What is claimed is:

1. A computer program product for selecting a host from a plurality of hosts for an application pattern component using a service level agreement requirement, the computer program product comprising a non-transitory computer readable storage medium having program code embodied therewith, the program code comprising computer readable program code configured to:

receive an application pattern, the application pattern including multiple middleware software elements compiled into a single deployable unit;

determine one or more application pattern components from the application pattern, the one or more application pattern components including a first application pattern component, the first application pattern component being a database component; and identify one or more service level agreement requirements for the first application pattern component, wherein the one or more service level agreement requirements of the first application pattern component include an uptime requirement;

receive a first set of capability metrics of a first host of the plurality of hosts;

determine whether the first set of capability metrics of the first host from the plurality of hosts satisfies the one or more service level agreement requirements of the first application pattern component;

determine that the first host does not meet the uptime requirement of the first application pattern component;

determine that a second host of the plurality of hosts does not meet the uptime requirement of the first application pattern component;

determine that a second set of capability metrics of a combination of the first and second hosts meets the uptime requirement of the first application pattern component in response to determining that the first set of capability metrics of the first host does not satisfy the one or more service level agreement requirements of the first application pattern component;

select the combination of the first and second hosts in response to the second set of capability metrics of the combination of the first and second hosts satisfying the uptime requirement of the first application pattern component, wherein selecting the combination of hosts includes recommending the user host the first application pattern component on both the first and second hosts; and host the first application pattern component on each of the first and second hosts.

2. The computer program product of claim 1, wherein the computer readable program code is further configured to:

select the first host in response to the first host satisfying the one or more service level agreement requirements of the first application pattern component.

3. The computer program product of claim 1, wherein receiving the first set of capability metrics includes:

registering the first host from the plurality of hosts;
requesting the first set of capability metrics from the first host;
recording the first set of capability metrics; and
updating the first set of capability metrics in response to changes in the recorded first set of capability metric from the first host.

4. The computer program product of claim 1, wherein the one or more service level agreement requirements further include a first service level agreement requirement, and wherein determining whether the first set of capability metrics of the first host satisfies the one or more service level agreement requirements includes:

receiving the one or more service level agreement requirements and a request for a recommendation of the host;
accessing a registry repository of capability metrics for the first host to identify a first capability metric; and
comparing the first service level agreement requirement to the first capability metric.

5. The computer program product of claim 1, wherein determining whether the first set of capability metrics of the first host satisfies the one or more service level agreement requirements comprises:

comparing each of the one or more service level agreement requirements to an associated capability metric in the first set of capability metrics.

6. The computer program product of claim 5, wherein the first set of capability metrics includes a first capability metric and a second capability metric, wherein the one or more service level agreement requirements include a first service level agreement requirement and a second service level agreement requirement, and wherein the comparing each of the one or more service level agreement requirements to an associated capability metric in the first set of capability metrics comprises:

comparing the first capability metric to the first service level agreement requirement; and
comparing the second capability metric to the second service level agreement requirement.

7. The computer program product of claim 1, wherein the one or more application pattern components further include a second application pattern component, and wherein the computer readable program code is further configured to:

identify one or more service level agreement requirements for the second application pattern component; and
determine whether the first set of capability metrics of the first host satisfies the one or more service level agreement requirements of the second application pattern component.

8. The computer program product of claim 7, wherein the computer readable program code is further configured to:

select the first host for the second application pattern component in response to the first host satisfying the one or more service level agreement requirements of the second application pattern component.

9. The computer program product of claim 1, wherein identifying one or more service level agreement requirements for the first application pattern component includes inferring the one or more service level agreement requirements from an application-level service level agreement.

10. An SLA registry service system, comprising:

a memory;
one or more processors in communication with the memory, the one or more processors being configured to perform a method comprising:
receiving an application pattern, wherein the application pattern includes multiple middleware software elements compiled into a single deployable unit;
determining one or more application pattern components from the application pattern, the one or more application pattern components including a first application pattern component, the first application pattern component being a database component;

identifying one or more service level agreement requirements for the first application pattern component, wherein the one or more service level agreement requirements of the first application pattern component include an uptime requirement;

receiving a first set of capability metrics of a first host of the plurality of hosts;

determining whether the first set of capability metrics of the first host from the plurality of hosts satisfies the one or more service level agreement requirements of the first application pattern component;

determining that the first host does not meet the uptime requirement of the first application pattern component;

determining that a second host of the plurality of hosts does not meet the uptime requirement of the first application pattern component;

determining that a second set of capability metrics of a combination of the first and second hosts meets the uptime requirement of the first application pattern component in response to determining that the first set of capability metrics of the first host does not satisfy the one or more service level agreement requirements of the first application pattern component;

selecting the combination of the first and second hosts in response to the second set of capability metrics of the combination of the first and second hosts satisfying the uptime requirement of the first application pattern component, wherein selecting the combination of hosts includes recommending the user host the first application pattern component on both the first and second hosts; and hosting the first application pattern component on each of the first and second hosts.

11. The system of claim 10, wherein receiving the first set of capability metrics includes:
registering the first host from the plurality of hosts;
requesting the first set of capability metrics from the first host;
recording the first set of capability metrics; and
updating the first set of capability metrics in response to changes in the recorded first set of capability metrics from the first host.

12. The system of claim 10, wherein receiving the first set of capability metrics of the first host includes:
receiving a first capability metric from a cloud provider.

* * * * *